United States Patent [19]

Abe et al.

[11] Patent Number: 4,891,392
[45] Date of Patent: Jan. 2, 1990

[54] PRODUCTION PROCESS OF POLYOLEFIN RESIN COMPOSITION CONTAINING INORGANIC FILLER

[75] Inventors: Masaru Abe; Yoichi Kawai, both of Yokohama; Minoru Hoshino, Kawasaki; Katsumi Sekiguchi, Yokohama, all of Japan

[73] Assignee: Mitsui Toatsu Chemicals, Incorporated, Tokyo, Japan

[21] Appl. No.: 158,460

[22] Filed: Feb. 22, 1988

[30] Foreign Application Priority Data

Feb. 24, 1987 [JP] Japan ................... 62-39175

[51] Int. Cl.$^4$ .......................... C08J 3/20; C08L 23/00; B29B 9/12
[52] U.S. Cl. ...................... 523/200; 523/205; 523/206; 523/209; 523/330; 523/351
[58] Field of Search ............. 523/200, 205, 206, 209, 523/330, 351

[56] References Cited

U.S. PATENT DOCUMENTS

| | | |
|---|---|---|
| 4,480,065 | 10/1984 | Kawai et al. . |
| 4,508,859 | 4/1985 | Muhle et al. .................. 523/346 |
| 4,510,271 | 4/1985 | Muhle et al. .................. 523/351 |
| 4,626,565 | 12/1986 | Kawai et al. . |
| 4,650,818 | 3/1987 | Oka et al. ..................... 523/209 |
| 4,699,935 | 10/1987 | Sano ........................... 523/206 |
| 4,705,818 | 11/1987 | Kawai et al. . |

FOREIGN PATENT DOCUMENTS 0220319 12/1984 Japan .

OTHER PUBLICATIONS

Derwent Abs. 86-024339 Chisso J60245654, 12-85.
Derwent Abs. 87-147659/21, Mitsui Toatsu J62086037 (4-87).
Derwent Abs. 81-91936V/50, Nippon Ekika J56139927 (10-81).
Derwent Abs. 81-82602D/45, Sumitomo J56122837 (9-81).
Derwent Abs. 87-330622/47, Mitsui Toatsu J62235352 (10-87).
Derwent Abs. 84-185789/30, Calp Kogyo J59105053 (6-84).

*Primary Examiner*—Herbert J. Lilling
*Attorney, Agent, or Firm*—Millen, White & Zelano

[57] ABSTRACT

A polyolefin resin composition is produced by pulverizing and surface-treating an inorganic filler together with a surface treatment agent in a dry or semi-dry pulverizing means, mixing the thus-treated inorganic filler with a specified amount of a polyolefin resin and granulating the resultant mixture, and thereafter mixing the thus-obtained granular mixture with an additional granular or pelletized polyolefin resin at a specified ratio.

13 Claims, No Drawings

PRODUCTION PROCESS OF POLYOLEFIN RESIN COMPOSITION CONTAINING INORGANIC FILLER

BACKGROUND OF THE INVENTION

This invention relates to an improved process for the production of a particulate moldable polyolefin resin composition which contains an inorganic filler and to the compositions thus produced.

DESCRIPTION OF THE PRIOR ART

Articles molded from polyolefin resin compositions which contain an inorganic filler, have good stiffness and heat resistance and have been widely used in various industrial parts.

In many instances, such compositions are produced by mixing an inorganic filler, various stabilizers such as antioxidant and heat stabilizer, and optionally a pigment with a polyolefin resin and then melting, kneading and pelletizing the resultant mixture employing a single-screw or twin-screw extruder. In general, the polyolefin resin employed is in the form of powder in order to disperse the inorganic filler therein. Use of such polyolefin powder is however accompanied by problems such as an increased production cost due to the need for its separate production from a polyolefin production line, reduced efficiency upon production of a polyolefin resin composition containing an inorganic filler, deterioration of the working environment, and the like.

When a pelletized polyolefin resin such as a thermoplastic elastomer is added to such powder mixtures, the resin tends to separate from powder materials in the hopper of an extruder so that a homogeneous composition cannot be obtained. There is hence an outstanding demand for a solution to this problem.

So long as the inorganic filler is in a powder form, problems similar to those mentioned above (i.e., reduced efficiency, deterioration of the working environment, and separation of the pelletized resin from powder materials in a hopper) remain even when a pelletized polyolefin resin is used. As a solution for these problems, a pelletized inorganic filler can be used successfully.

As a production method for producing such a pelletized inorganic filler, it is known to perform granulation using an agitation granulator such as a Henschel mixer. For example, reference may be had to Chapter 9 of "Zoryu Binran (Handbook of Granulation)" (published May 30, 1975 by The OHM SHA K.K.), where numerous illustrative examples led by calcium carbonate are described. On the other hand, Japanese Patent Laid-Open No. 220319/1984 discloses that a mixture composed of 100 parts by weight of a thermoplastic resin and 60 parts by weight or more of fine solid powder, which does not melt at the melting point of the resin, is vigorously agitated in a high-speed rotary mixer while being heated at a temperature of at least the melting point of the resin, and the resulting mixture is cooled and solidified into a resin compound with the formation of porous agglomerated granules of the thermoplastic resin coated with the fine solid powder and partially fused together.

An attempt may be made to blend an inorganic-filler-containing polyolefin resin, which has been granulated by such a method as described above, with an additional supply of pelletized polyolefin resin free of any inorganic filler and then to pelletize the resultant resin mixture subsequent to their re-melting, mixing and kneading in an extruder. The dispersibility of the inorganic filler is however low depending on its type. The resulting molded article often has different stiffness and impact strength from one point to another and its external appearance is frequently poor, whereby the molded article may not be used actually. For the molding of the above pellets, it is hence indispensable to use an extruder having extremely good kneadability dispersability. Under the circumstances, the productivity decreases and the production cost becomes considerably high.

SUMMARY OF THE INVENTION:

An object of this invention is to provide an improved process for the production of a polyolefin resin composition containing an inorganic filler in a very well dispersed state, which composition can provide a molded article having good physical properties such as stiffness and impact resistance.

Other objects of this invention will become apparent from the following description.

The above and other objects of this invention can be attained by the following process for the production of a polyolefin resin composition containing an inorganic filler:

A process for the production of a polyolefin resin composition containing an inorganic filler, which comprises mixing a polyolefin resin and the inorganic filler, which has been pulverized together with a surface treatment agent by a dry or semi-dry pulverizing means, in an amount of 300–900 parts by weight per 100 parts by weight of the polyolefin resin; granulating the resultant mixture by an agitated granulating means; and then mixing the thus-granulated polyolefin resin [hereinafter be called "resin (a)"] with an additional polyolefin resin which is granular or pelletized [hereinafter called "resin (b)"] at an (a)/(b) weight ratio in a range of from 1/99 to 80/20.

DETAILED DESCRIPTION OF THE PREFERRED EMBODIMENTS:

In the present invention, the polyolefin resins used for the resins (a) and (b) may be the same or different. Illustrative examples of the polyolefin resins include homopolymers of α-olefins such as ethylene, propylene, 1-butene and 4-methylpentene, copolymers of two or more of the α-olefins, and mixtures of these polymers and copolymers. The following polyolefin resins are typical examples of the polyolefin resins: polyethylene, polypropylene, polybutene, poly-4-methyl-pentene-1, and ethylene-propylene copolymers.

Specific examples of the inorganic filler useful in the practice of this invention, are calcium oxide, magnesium oxide, calcium hydroxide, magnesium hydroxide, aluminum hydroxide, calcium carbonate, magnesium carbonate, calcium silicate, magnesium silicate, calcium sulfate, barium sulfate, calcium sulfite, talc, mica, clay, dolomite, glass, etc.

The proportion of the inorganic filler in the resin (a) is 300–900 parts by weight, preferably, 325–500 parts by weight per 100 parts by weight of the polyolefin resin. If the proportion of the inorganic filler is smaller than 300 parts by weight, the proportion of the polyolefin resin is too much. When the polyolefin resin has melted in a granulator, the resultant mixture becomes a single mass as a whole and its handling is very difficult. It is hence not preferable to use the inorganic filler in such a small proportion. On the other hand, any proportion greater than 900 parts by weight result in an excessively small proportion of the polyolefin resin so that the inorganic filler can no longer be granulated successfully.

The grain size of the resin (a) preferably is about 0.3–7 mm, while the preferred grain size of the resin (b) is from 0.1 to 10 mm approximately. Use of any grain sizes outside the above range tends to cause separation into portions having different grain sizes when the resins (a) and (b) are mixed and pelletized again. It is hence not preferable to use any grain sizes outside the above ranges.

Any surface treatment agent can be used in the practice of this invention, so long as it can improve the compatibility of the inorganic filler with the polyolefin resins. The surface treatment agent may hence be chosen from a wide variety of surface treatment agents which have been used for the above-mentioned purpose. Illustrative examples include silane coupling agents such as γ-aminopropyltriethoxysilane and vinyltris(β-methoxyethoxy)silane; titanium base coupling agents such as isopropyl triisostearictitanate; various surface active agents such as polyoxyethylene alkyl ether and N,N-bis(2-hydroxyethyl) aliphatic amine; organosilicon-containing polymers such as silicone oils, polyether-modified silicone oils, alcohol-modified silicone oils, amino-modified silicone oils, trimethylmethoxysilane, methyltriethoxysilane, dimethylpolysiloxysilazane and hexamethyldisilazane; higher alcohols such as polyethylene glycol; modified vegetable oils such as epoxylated linseed oil and epoxylated soybean oil; etc.

It is preferable to use the surface treatment agent in an amount of about 0.01 - about 5 parts by weight per 100 parts by weight of the inorganic filler. Any amounts smaller than 0.01 part by weight are too small to exhibit effects of the surface treatment, so that the dispersion of the inorganic filler is poor in the resulting resin composition and the resin composition can only provide molded articles of reduced stiffness and impact resistance and impaired external appearance. If the amount of the surface treatment agent is greater than 5 parts by weight, more time is required upon heating at the time of agitation and granulation so that the productivity is lowered. In addition, an article produced from the final composition may be reduced in stiffness, heat resistance and the like and moreover, the production cost becomes higher. It is therefore not preferable to use the surface treatment agent in any proportions outside the above range.

The surface treatment of such an inorganic filler may be performed by mixing the inorganic filler and surface treatment agent in advance, or by feeding them separately to a pulverizer and then effecting the surface treatment concurrently with the pulverization.

Here, as the above-mentioned pulverizer, any pulverizer may be employed so long as it can perform both rough pulverization and fine pulverization in either dry or semi-dry fashion. As illustrative examples of such a pulverizer, may be mentioned micron mill, jet stream pulverizer, ball mill, micronizer, turbomill, atomizer, etc. In view of the efficiency and time of pulverization and the efficiency of work, a jet stream pulverizer (for examples, micronizer-type, reductionizer-type, impact-type, countercurrent-type or fluid-bed type) is preferred. Among these, a fluid-bed type jet stream pulverizer permitting a still more homogeneous treatment is particularly preferred.

The polyolefin resin of the resin (b) is preferred to have a grain size of 0.1-10 mm. If any grain size outside the above range is used, the separation of the resin (b) from the resin (a) and vice versa takes place in the hopper of an extruder upon re-pelletization, so that articles to be molded from the resulting composition will not be equal to each other in stiffness and impact resistance and their external appearance will become poor. Hence, any grain sizes outside the above range are not preferred.

The mixing weight ratio of the resin (a) to the resin (b) ranges from 1/99 to 80/20. Any ratio smaller than 1/99 cannot fully exhibit the effects of the addition of the inorganic filler, and any ratio greater than 80/20 results in a composition which can only provide molded articles of reduced impact resistance and external appearance. Therefore, any ratios outside the above range are not preferred.

In the present invention, various additives such as antioxidant, lubricant, ultraviolet absorbent, ultraviolet stabilizer, heat stabilizer, antistatic agent, nucleating agent, and organic and inorganic pigments may be added either singly or in combination. As illustrative examples of these various additives, may be mentioned those added routinely to polyolefin resins. They may be used to extents not impairing the advantageous effects of the present invention substantially. Resins other than polyolefin resins usable in the present invention may also be used in combination as needed. Examples of such other resins include thermoplastic elastomers such as ethylene-propylene copolymer rubbers (EPR), ethylene-propylene-diene terpolymer rubbers (EPDM, examples of the diene may include ethylidene norbornene, dicyclopentaidene and 1,4-hexadiene). It is particularly preferable that the resin composition of the invention includes 40% or less of EPR or EPDM on the basis of the weight of the polyolefin resins, since impact resistance of an article molded from the resulting resin composition is considerably improved.

These additives may be added to the resin (a) and/or the resin (b), previously. As an alternative, they may also be added upon mixing the resin (a) with the resin (b). Here, in order to facilitate the dispersion and mixing of such additives, it is preferable to use liquid additives. They may also be added upon performing the melting, mixing and kneading in an extruder.

The mixing of the individual components may be achieved by melting, mixing, kneading and pelletizing them by means of a single-screw or twin-screw extruder or the like after mixing them beforehand in a tumbler mixer, Henschel mixer or the like or feeding the resin (a) through a vent of the extruder by way of a fixed-rate feeder. These pellets can then be molded into a desired product by a suitable molding or forming method such as extrusion molding, injection molding, rotation molding or compression molding.

In the resin composition produced in accordance with the process of this invention, the inorganic filler has been dispersed very well at the time of the repelletization. Molded articles balanced well in physical properties such as stiffness and impact resistance can be obtained by molding the resin composition. Since the resin composition has good properties, it is suited for the molding of various industrial parts.

Certain Examples of the present invention will hereinafter be described along with some Comparative Examples so as to describe advantageous effects of the present invention specifically. In the following Examples and Comparative Examples, melt flow indexes (MI), flexural moduli of elasticity, Izod impact strengths, Du Pont impact strengths and heat distortion temperatures were measured in accordance with ASTM D-1238, ASTM D-790, ASTM D-256, JIS (Japanese Industrial Standard) K-6718 and ASTM D648 respectively.

Inorganic fillers employed in the Examples and Comparative Examples will be shown in Table 1. The following procedures were employed to treat the surfaces of the inorganic fillers.

(1) Raw materials:
[Talc] Average particle size: about 10 μm. The particle size was normal distribution.
[Mica] Average particle size: about 15 μm. The particle size was normal distribution.
[Calcium carbonate] Heavy calcium carbonate whose average particle size was about 15 μm.

(2) Pulverizer and pulverizing conditions:
Pulverizer: Fluid-bed counter jet mill (Model 400AFG; manufactured by Alpine GmbH, W. Germany).
Pulverizing conditions: Air flow: 1620 m³/hr. Pulverizing pressure: 6 kg/cm² (compressed air was used). Revolution number of classifier: 4000 rpm.

(3) Surface treatment agents and amounts added: See Table 1.

(4) Treatment method:
One of the raw materials described above in (1) and its corresponding surface treatment referred to in (3) were fed separately to the pulverizer described in (2), whereby the former was pulverized and at the same time, surface-treated with the latter.

g/10 min, 0.17 part by weight of calcium stearate, 0.17 part by weight of pentaerythrytyl-tetrakis-[3-(3,5-di-t-butyl-4-hydroxyphenyl) propionate] and 0.08 part by weight of tris(2,4-di-t-butylphenyl) phosphite. The mixer was rotated at about 600 rpm under a nitrogen seal and 5 minutes later, the rotation of the mixture was speeded up to about 1200 rpm and continued at that revolution number.

About 40 minutes later, the temperature in the tank reached 185° C. When the load current of a mixer started swinging widely due to gelation, a discharge valve was opened to transfer the contents to a cooling Henschel mixer [Model: 500C/K, trade name; manufactured by Mitsui Miike Engineering Corporation]and then the transferred contents were cooled in the cooling Henschel mixer at 300 rpm. After cooling, the thus-granulated composition was taken out of the cooling Henschel mixer and sifted, so that 205 parts by weight of a granular polypropylene resin having a grain size of 2-5 mm and containing the inorganic filler were obtained. (Content of the inorganic filler: 80.6 wt.%) (A-1).

Various resins (a) shown in Table 2 were obtained in the same manner.

On the other hand, 0.1 part by weight of calcium stearate, 0.1 part by weight of pentaerythrytyl-tetrakis[3-(3,5-di-t-butyl-4-hydroxyphenyl) propionate] and 0.05 part by weight of tris(2,4-di-t-butylphenyl) phosphite were mixed with 100 parts by weight of a crystalline ethylene-propylene block copolymer powder (PP Powder-A) having an ethylene content of 6.8 wt.%, a MI of 8.0 g/10 min and a grain size distribution consisting of 3 wt.% of 3 mm and up, 17 wt.% of 1 mm (inclusive) - 3 mm (exclusive), 17 wt.% of 0.5 mm (inclusive) - 1 mm (exclusive), 57 wt.% of 0.1 mm (inclusive) - 0.5 mm (exclusive) and 6 wt.% of smaller than 0.1 mm. The resultant mixture was pelletized at 210° C. to obtain a pelletized polypropylene resin having an average grain size of 2.5 mm (PP Pellet-A). Using this pelletized polypropylene resin and the aforementioned granular resin composition (A-1), they were blended at a ratio shown in Table 3. The resulting blend was then pellet-

TABLE 1

| | Inorganic Fillers | | | |
|---|---|---|---|---|
| | Inorganic filler | | Surface treatment agent | | |
| | Kind | Wt. parts | Kind | Wt. parts | Pulverizer |
| Example | | | | | |
| Inorganic filler A | Talc | 100 | Dimethylpoly-siloxysilazane | 1.0 | Fluid-bed jet pulverizer |
| Inorganic filler B | " | 100 | Dimethylpoly-siloxysilazane | 3.0 | Fluid-bed jet pulverizer |
| Inorganic filler C | " | 100 | γ-aminopropyl-triethoxysilane | 1.0 | Fluid-bed jet pulverizer |
| Inorganic filler D | " | 100 | N,N—bis(2-hydroxyethyl)-aliphatic amine | 1.0 | Fluid-bed jet pulverizer |
| Inorganic filler E | Calcium carbonate | 100 | Dimethylpoly-siloxysilazane | 1.0 | Fluid-bed |
| Inorganic filler F | Mica | 100 | Dimethylpoly-siloxysilazane | 1.0 | Fluid-bed jet pulverizer |
| Comp. Ex. | | | | | |
| Inorganic filler G | Talc | 100 | Not used | — | Fluid-bed jet pulverizer |
| Inorganic filler H | " | 100 | Dimethylpoly-siloxysilazane | 0.005 | Fluid-bed jet pulverizer |
| Inorganic filler I | " | 100 | Dimethylpoly-siloxysilazane | 1.0 | Henschel mixer |

EXAMPLES 1-3:

Charged in an agitated granulating Henschel mixer [Model: FM-300A (trade name); manufactured by Mitsui Miike Engineering Corporation] were 420 parts by weight of the inorganic filler A, 100 parts by weight of a crystalline ethylene-propylene block copolymer having an ethylene content of 12.8 wt.% and a MI of 42 ized at 210° C. by means of a single-screw extruder whose diameter was 40 mm. The pellets were molded into predetermined test pieces by an injection molding machine to measure various physical properties.

In addition, the dispersibility of the filler was determined by the following method.

In the above procedure, 1.0 part by weight of fine powder of an organic pigment composed principally of phthalocyanin blue was added to obtain colored pellets. The pellets were molded at 230° C. into a plate of 80×160×2 mm by an injection molding machine whose mold was equipped with a pin gate. The surface conditions of the plate were visually observed to be determined in accordance with the following standard.

O: Free of flash and segregation due to poor dispersion of the filler.

Δ: Some flash and segregation due to poor dispersion of the filler.

X: Substantial flash and segregation due to poor dispersion of the filler.

Results will be shown in Table 3.

EXAMPLES 4-11 AND COMPARATIVE EXAMPLES 1-3:

The test of Example 1 was repeated in the same manner except that the resin (a) was replaced separately by A-2 - A-12 given in Table 2. Results will be shown in Table 4.

COMPARATIVE EXAMPLE 4:

The test of Example 2 was repeated in same manner except that the pelletized polypropylene resin and Inorganic Filler A were used in their respective proportions to be given in Table 4. Results will also be shown in Table 4.

EXAMPLE 12:

The test of Example 3 was repeated in the same manner except for the additional incorporation of 10 parts by weight of a pelletized ethylene-propylene copolymer rubber (EPR) having an ethylene content of 75 wt.% and Mooney viscosity ($Ml_{1+4}^{100° C.}$) of 28.

TABLE 2

|  | Inorganic filler | | Resin (2) Resin | | Results | |
|---|---|---|---|---|---|---|
| Name | Kind | Amount (weight parts) | Kind | Amount (weight parts) | Amount of grains of 2-5 mm grains (wt. parts) | Content of inorganic filler (wt. %) |
| Example | | | | | | |
| A-1 | Inorganic filler A | 420 | PP | 100 | 245 | 80.6 |
| A-2 | Inorganic filler A | 350 | PP | 100 | 215 | 77.5 |
| A-3 | Inorganic filler A | 350 | PE | 100 | 225 | 77.3 |
| A-4 | Inorganic filler A | 350 | PP/PE | 50/50 | 198 | 77.5 |
| A-5 | Inorganic filler B | 420 | PP | 100 | 208 | 80.1 |
| A-6 | Inorganic filler C | 420 | PP | 100 | 181 | 79.9 |
| A-7 | Inorganic filler D | 420 | PP | 100 | 171 | 81.5 |
| A-8 | Inorganic filler E | 420 | PP | 100 | 196 | 80.6 |
| A-9 | Inorganic filler F | 420 | PP | 100 | 218 | 80.9 |
| Comp. Ex. | | | | | | |
| A-10 | Inorganic filler G | 420 | PP | 100 | 225 | 79.8 |
| A-11 | Inorganic filler H | 420 | PP | 100 | 220 | 80.6 |
| A-12 | Inorganic filler I | 420 | PP | 100 | 201 | 80.7 |
| A-13 | Inorganic filler A | 1000 | PP | 100 | 0 | — |
| A-14 | Inorganic filler A | 280 | PP | 100 | Test was stopped in the course. Extremely many grains of about 50 mm were formed. | |

PP: Powder block copolymer whose ethylene content and MI were 12.8 wt. % and 42 g/10 min.
PE: Powder high-density polyethylene whose density and MI were 0.963 g/cm³ and 5.3 g/10 min.
Other additives:
0.17 part by weight of calcium stearate.
0.17 part by weight of pentaerythrytyl-tetrakis[3-(3,5-di-t-butyl-4-hydroxyphenyl) propionate].
0.08 part by weight of tris(2,4-di-t-butylphenyl) phosphite.

REFERENTIAL EXAMPLES 1-3:

The test of Example 1 was repeated in the same manner except that in place of the pelletized polypropylene resin and granular inorganic filler, PP Powder-A and Inorganic Filler A were used in their corresponding proportions to be given in Table 3. Results will also be shown in Table 3.

Results will be shown in Table 5.

COMPARATIVE EXAMPLE 5:

The test of Referential Example 3 was repeated in the same manner except for the additional incorporation of 10 parts by weight of EPR. Results will also be given in Table 5.

In the test, separation between the powder portion and the pellet portion was observed in the hopper of the extruder.

TABLE 3

|  | Unit | Example | | | Referential Example | | |
|---|---|---|---|---|---|---|---|
|  |  | 1 | 2 | 3 | 1 | 2 | 3 |
| Component | | | | | | | |
| PP Pellet-A | | 87.6 | 75.2 | 62.8 | | | |
| A-1 | wt. % | 12.4 | 24.8 | 37.2 | | | |
| PP Powder-A | | | | | 90 | 80 | 70 |
| Inorganic Filler A | | | | | 10 | 20 | 30 |
| Result of property evaluation | | | | | | | |

TABLE 3-continued

|  | Unit | Example 1 | Example 2 | Example 3 | Referential Example 1 | Referential Example 2 | Referential Example 3 |
|---|---|---|---|---|---|---|---|
| MI | g/10 min | 8.3 | 8.5 | 8.7 | 7.9 | 7.7 | 7.2 |
| Flexural modulus of elasticity | kg/cm$^2$ | 24000 | 31600 | 38500 | 24100 | 31500 | 38800 |
| Izod impact strength 23° C. | kg·cm/cm | 6.2 | 5.1 | 4.4 | 6.3 | 5.0 | 4.4 |
| Izod impact strength −10° C. | | 3.4 | 3.5 | 3.2 | 3.3 | 3.6 | 3.3 |
| Du Pont impact strength 23° C. | kg·cm/φ ½" | 45–50 | 35–40 | 30–35 | 45–50 | 35–40 | 32–37 |
| Du Pont impact strength −10° C. | | 15–20 | 7–9 | 5–7 | 15–20 | 8–10 | 5–7 |
| Heat distortion temperature (4.6 kg/cm$^2$) | °C. | 134 | 141 | 146 | 135 | 140 | 146 |
| External appearance | — | | | | | | |

TABLE 4

|  | Unit | Example 4 | Example 5 | Example 6 | Example 7 | Example 8 | Example 9 |
|---|---|---|---|---|---|---|---|
| Component | | | | | | | |
| PP Pellet-A | | 74.2 | 74.1 | 74.2 | 75.0 | 75.0 | 75.5 |
| A-2 | | 25.8 | | | | | |
| A-3 | | | 25.9 | | | | |
| A-4 | | | | 25.8 | | | |
| A-5 | wt. % | | | | 25.0 | | |
| A-6 | | | | | | 25.0 | |
| A-7 | | | | | | | 24.5 |
| Result of property evaluation | | | | | | | |
| MI | g/10 min | 8.2 | 8.1 | 8.6 | 8.2 | 8.5 | 8.2 |
| Flexural modulus of elasticity | kg/cm$^2$ | 31400 | 30500 | 31000 | 32000 | 32500 | 31200 |
| Izod impact strength 23° C. | kg·cm/cm | 5.0 | 6.0 | 5.7 | 5.0 | 5.5 | 5.0 |
| Izod impact strength −10° C. | | 3.5 | 4.2 | 3.8 | 3.4 | 3.6 | 3.3 |
| Du Pont impact strength 23° C. | kg·cm/φ ½" | 33–38 | 40–45 | 38–43 | 35–40 | 30–35 | 35–40 |
| Du Pont impact strength −10° C. | | 8–10 | 10–13 | 9–12 | 8–10 | 7–9 | 9–12 |
| Heat distortion temperature (4.6 kg/cm$^2$) | °C. | 140 | 139 | 140 | 140 | 142 | 139 |
| External appearance | — | | | | | | |

|  | Unit | Example 10 | Example 11 | Comparative Example 1 | Comparative Example 2 | Comparative Example 3 | Comparative Example 4 |
|---|---|---|---|---|---|---|---|
| Component | | | | | | | |
| PP Pellet-A | | 75.2 | 75.3 | 74.9 | 75.2 | 75.2 | 80 |
| A-8 | | 24.8 | | | | | |
| A-9 | | | 24.7 | | | | |
| A-10 | | | | 25.1 | | | |
| A-11 | wt. % | | | | 24.8 | | |
| A-12 | | | | | | 24.8 | |
| Inorganic Filler A | | | | | | | 20 |
| Result of property evaluation | | | | | | | |
| MI | g/10 min | 11.2 | 8.8 | 8.0 | 8.1 | 8.3 | 8.1 |
| Flexural modulus of elasticity | kg/cm$^2$ | 20100 | 30500 | 30200 | 30800 | 30300 | 30100 |
| Izod impact strength 23° C. | kg·cm/cm | 7.9 | 5.8 | 4.8 | 5.0 | 4.8 | 3.9 |
| Izod impact strength −10° C. | | 3.5 | 4.2 | 3.0 | 3.0 | 2.9 | 2.7 |
| Du Pont impact strength 23° C. | kg·cm/φ½" | 50–55 | 25–30 | 28–33 | 30–35 | 30–35 | 20–25 |
| Du Pont impact strength −10° C. | | 35–40 | 9–11 | 3–5 | 5–7 | 5–7 | 2–4 |
| Heat distortion temperature (4.6 kg/cm$^2$) | °C. | 121 | 141 | 128 | 129 | 128 | 127 |
| External appearance | — | | | X | Δ | Δ | X |

TABLE 5

|  | Unit | Example 12 | Comparative Example 5 |
|---|---|---|---|
| Component | | | |
| PP Pellet-A | | 62.8 | |
| A-1 | | 37.2 | |
| EPR | wt. % | 10 | 10 |
| PP Powder A | | | 70 |
| Inorganic Filler A | | | 30 |
| Result of property evaluation | | | |
| MI | g/10 min | 7.6 | 7.2 |
| Flexural modulus of | kg/cm$^2$ | 29500 | 27800 |
| Izod impact strength 23° C. | kg·cm/cm | 30.5 | 25.3 |
| Izod impact strength −10° C. | | 6.0 | 5.2 |

TABLE 5-continued

| | Unit | Example 12 | Comparative Example 5 |
|---|---|---|---|
| Du Pont impact strength | 23° C. −10° C. | kg · cm/φ ½" | >300 125–135 | 280–290 110–120 |
| Heat distortion temperature (4.6 kg/cm$^2$) | °C. | 136 | 135 |
| External appearance | — | | |

[EPR] Ethylene content: 75 wt. %, $ML_{1+4}^{100° C.}$: 28

What is claimed is:

1. A process for the production of a granular moldable polyolefin resin composition containing an inorganic filler, comprising the steps of
   (a) pulverizing the inorganic filler with a surface treatment agent in an amount of 0.01–15 parts by weight per 100 parts by weight of the organic filler by a jet stream pulverizing means in a dry or semi-dry state;
   (b) mixing the thus-treated inorganic filler with a polyolefin resin at a filler to resin ration of 3:1 to 9:1 by weight;
   (c) granulating the resultant mixture by an agitation granulating means; and
   (d) mixing the thus-granulated mixture with an unfilled polyolefin resin which is granular or pellet-like at a weight ratio of 1:99 to 80:20.

2. A process according to claim 1, wherein the jet stream pulverizing means is a fluidized bed jet pulverizing means.

3. The process as claimed in claim 1, wherein the granulated polyolefin resin has a grain size in a range of 0.3–7 mm.

4. The process as claimed in claim 1, wherein the granular or pelletized polyolefin resin has a grain size in a range of 0.1–10 mm.

5. The process as claimed in claim 1, wherein the surface treatment agent is used in an amount of 0.01–5 parts by weight per 100 parts by weight of the inorganic filler.

6. The process as claimed in claim 1, wherein 325–500 parts by weight of the inorganic filler is mixed per 100 parts by weight of the first-mentioned polyolefin resin.

7. The process as claimed in claim 1, wherein the polyolefin resin composition further contains 40% or less of an ethylene-propylene copolymer rubber or an ethylene-propylene-diene terpolymer rubber on the basis of the weight of the polyolefin resin.

8. In a process for the production of a granular moldable polyolefin resin composition containing an inorganic filler wherein a mixture of polyolefin resin and an inorganic filler is granulated, the improvement which comprises producing the starting mixture by pulverizing the polyolefin resin and inorganic filler at a filler to resin ratio of 3:1 to 9:1 by weight by a jet stream pulverizing means in a dry or semi-dry state as a mixture with a surface treating agent in an amount of 0.01–5 parts by weight per 100 parts by weight of the organic filler and mixing the thus-produced granulated mixture with an unfilled granular or pelletized polyolefin resin composition at a weight ratio of 1:909 to 80:20.

9. The process as claimed in claim 8, wherein the filled resin composition has a grain size in a range of 0.3–7 mm and the unfilled resin composition has a grain size in a range of 0.1–10 mm.

10. The process as claimed in claim 8, wherein the weight ratio of inorganic filler to polyolefin in the filled resin composition is from 325:100 to 500:100.

11. The process as claimed in claim 8, wherein the polyolefin in the filled and unfilled portions of the mixture is a crystalline ethylene-polypropylene block copolymer, a high density polyethylene or a mixture thereof.

12. The process as claimed in claim 8, wherein the surface treating agent is selected from the group consisting of silane coupling agents, titanium base coupling agents, surface active agents, organosilicon-containing polymers, polyether-modified silicone oils, alcohol-modified silicone oils, amino-modified silicone oils, trimethylmethoxysilane, methyltriethoxysilane, dimethylpolysiloxysilazane, hexamethyldisilazane, higher alcohols and modified vegetable oils.

13. The process as claimed in claim 13, wherein the polyolefin resin composition further contains 40% or less of an ethylene-propylene copolymer rubber or an ethylene-propylene-diene terpolymer rubber on the basis of the weight of the polyolefin resin.

* * * * *

UNITED STATES PATENT AND TRADEMARK OFFICE
CERTIFICATE OF CORRECTION

PATENT NO. : 4,891,392

DATED : January 2, 1990

INVENTOR(S) : MASARU ABE ET AL

It is certified that error appears in the above-identified patent and that said Letters Patent is hereby corrected as shown below:

Title page, title:

reads "PRODUCTION PROCESS OF POLYOLEFIN RESIN COMPOSITION CONTAINING INORGANIC FILLER"

should read -- PRODUCTION OF PARTICULATE MOLDABLE FILLED POLYOLEFIN RESIN COMPOSITION --

Column 12, claim 8, line 23:

reads "tion at a weight ratio of 1:909 to 80:20."

should read -- tion at a weight ratio of 1:99 to 80:20. --

Signed and Sealed this

Eighteenth Day of December, 1990

Attest:

HARRY F. MANBECK, JR.

*Attesting Officer*      *Commissioner of Patents and Trademarks*